US010142861B2

United States Patent
Huang et al.

(10) Patent No.: US 10,142,861 B2
(45) Date of Patent: Nov. 27, 2018

(54) METHOD AND DEVICE FOR MONITORING DEVICE-TO-DEVICE COMMUNICATION AND COMPUTER STORAGE MEDIUM

(71) Applicant: ZTE CORPORATION, Shenzhen, Guangdong Province (CN)

(72) Inventors: Ying Huang, Shenzhen (CN); Sergio Parolari, Shenzhen (CN); Lin Chen, Shenzhen (CN); Yuqin Chen, Shenzhen (CN); Li Chu, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 61 days.

(21) Appl. No.: 15/309,377

(22) PCT Filed: Aug. 14, 2014

(86) PCT No.: PCT/CN2014/084395
§ 371 (c)(1),
(2) Date: Nov. 7, 2016

(87) PCT Pub. No.: WO2015/169004
PCT Pub. Date: Nov. 12, 2015

(65) Prior Publication Data
US 2017/0078898 A1 Mar. 16, 2017

(30) Foreign Application Priority Data
May 8, 2014 (CN) .......................... 2014 1 0193719

(51) Int. Cl.
*H04W 24/02* (2009.01)
*H04W 76/20* (2018.01)
(Continued)

(52) U.S. Cl.
CPC .......... *H04W 24/02* (2013.01); *H04W 72/044* (2013.01); *H04W 76/14* (2018.02); *H04W 76/20* (2018.02); *H04W 72/04* (2013.01)

(58) Field of Classification Search
CPC ..... H04W 24/02; H04W 76/20; H04W 76/14; H04W 72/044; H04W 72/04
See application file for complete search history.

(56) References Cited

U.S. PATENT DOCUMENTS

2012/0093098 A1* 4/2012 Charbit ................. H04W 72/04
370/329
2015/0271846 A1* 9/2015 Kowalski .............. H04W 72/14
370/329

FOREIGN PATENT DOCUMENTS

CN 103024911 A 4/2013
CN 103686691 A 3/2014
(Continued)

OTHER PUBLICATIONS

International Search Report and Written Opinion dated Feb. 25, 2015 for International Application No. PCT/CN2014/084395.
(Continued)

*Primary Examiner* — Thai Nguyen
(74) *Attorney, Agent, or Firm* — Plumsea Law Group, LLC

(57) ABSTRACT

The present invention discloses a method for monitoring Device-to-Device (D2D) communication, including: a D2D User Equipment (UE) acquiring D2D receiving resource pool information, and monitoring D2D resources according to the D2D receiving resource pool information. The present invention further discloses a device for monitoring D2D communication and a computer storage medium.

11 Claims, 3 Drawing Sheets

(51) Int. Cl.
*H04W 72/04* (2009.01)
*H04W 76/14* (2018.01)

(56) References Cited

FOREIGN PATENT DOCUMENTS

| WO | 2010/049801 A1 | 5/2010 |
| WO | 2010/082084 A1 | 7/2010 |
| WO | 2012159270 A1 | 11/2012 |

OTHER PUBLICATIONS

Extended European Search Report dated Jul. 10, 2017 for European Patent Application No. 14891540.8.

* cited by examiner

METHOD AND DEVICE FOR MONITORING DEVICE-TO-DEVICE COMMUNICATION AND COMPUTER STORAGE MEDIUM

CROSS-REFERENCE TO RELATED APPLICATION(S)

This application is the U.S. National Phase application of PCT application number PCT/CN2014/084395 having a PCT filing date of Aug. 14, 2014, which claims the priority of Chinese patent application 201410193719.1 filed on May 8, 2014, the entire disclosures of which are hereby incorporated by reference.

TECHNICAL FIELD

The present document relates to the technical field of wireless communications, in particular to a method and a device for monitoring device-to-device communication and a computer storage medium.

BACKGROUND

With the development of wireless multimedia service, the demands of people for high data rate and user experience are gradually increased and thus higher requirements are raised to system capacity and coverage of the traditional cellular network. In another aspect, the popularization of applications such as social network, near-field data sharing and local advertisement enable people to understand nearby interested people or things and communicate the people, i.e., the demands for proximity services are gradually increased. The traditional cell-based cellular network has obvious limitations in the aspects of support of high data rate and proximity services. Under the background of this demand, a Device-to-Device (D2D) technology which represents a new development direction of future communication technology emerges. By adopting the D2D technology, the burden of the cellular network can be relieved, the battery power consumption of user equipments can be reduced, the data rate can be improved, the robustness of network infrastructure can be improved and the requirements of high data rate service and proximity services are well satisfied.

The D2D technology can work at authorized frequency bands or unauthorized frequency bands and allows a plurality of user equipments which support a D2D function, i.e., D2D User Equipment (UE) to directly discover or directly communicate under the situation that there is network infrastructure or there is no network infrastructure. The application scenarios of D2D mainly include three types:

1) UE1 and UE2 perform communication under coverage of a cellular network, e.g., mode 1 illustrated in FIG. 1, in which user plane data do not pass through network infrastructure;

2) UE in weakly covered areas or non-covered areas perform communication through UE relay covered by a network, e.g., mode 2 illustrated in FIG. 1, in which UE4 with poor signal quality is allowed to communicate with a network through proximity UE3 covered by the network, such that an operator can be helped to expand coverage and improve capacity;

3) Direct communicate between UEs are allowed under a situation that a cellular network cannot normally work in case of earthquakes or emergency situations, e.g., mode 3 illustrated in FIG. 1, in which a control plane and a user plane between UE5, UE6 and UE7 perform one-hop or multi-hop data communication not through network infrastructure.

The D2D technology usually includes a D2D discovery technology and a D2D communication technology:

1) The D2D discovery technology refers to a technology which is used for judging or determining that two or more D2D user equipment are proximity with one another (e.g., within a range that D2D direction communication can be performed) or is used for judging or determining that a first D2D user equipment is proximity to a second D2D user equipment.

2) The D2D communication technology refers to a technology that partial or all communication data between D2D user equipment can be directly communicated not through the network infrastructure.

In D2D communication, in one aspect, D2D UE needs to avoid missing D2D communication data which possibly need to be received, in another aspect, since the D2D UE receives D2D Scheduling Assignment (SA) by adopting a blind detection mode, if a D2D SA receiving resource pool which needs to be monitored is greater, a great amount of UE power consumption will be caused. In addition, when the D2D UE monitors the D2D SA receive receiving resource pool, cellular communication or D2D sending cannot be simultaneously performed, and thereby the cellular communication or D2D sending will be influenced since monitoring time of D2D SA is too long.

SUMMARY

In order to solve the above technical problems, the embodiments of the present document mainly provide a method and a device for monitoring Device-to-Device (D2D) communication and a computer storage medium, such that D2D UE can effectively monitor D2D resources.

The technical scheme of the embodiments of the present document is implemented as follows.

An embodiment of the present document provides a method for monitoring Device-to-Device, D2D, communication, including:

a D2D User Equipment, UE, acquiring D2D receiving resource pool information and monitoring D2D resources according to the D2D receiving resource pool information.

An embodiment of the present document provides a device for monitoring Device-to-Device (D2D) communication data, including an acquisition module and a monitoring module, herein, the acquisition module is configured to acquire D2D receiving resource pool information and send the acquired D2D receiving resource pool information to the monitoring module; and the monitoring module is configured to monitor D2D resources according to the D2D receiving resource pool information.

An embodiment of the present document further provides a computer storage medium, storing a computer program, herein the computer program is used for executing the above method for monitoring D2D communication data.

According to the method and device for monitoring D2D communication and the computer storage medium provided by the present document, D2D UE acquires D2D receiving resource pool information and monitors D2D resources according to the D2D receiving resource pool information, and thereby the D2D UE can effectively monitor the D2D resources, so as to realize D2D UE electricity saving and avoid the miss of D2D communication data which possibly need to be received.

DETAILED DESCRIPTION

Figure 1:
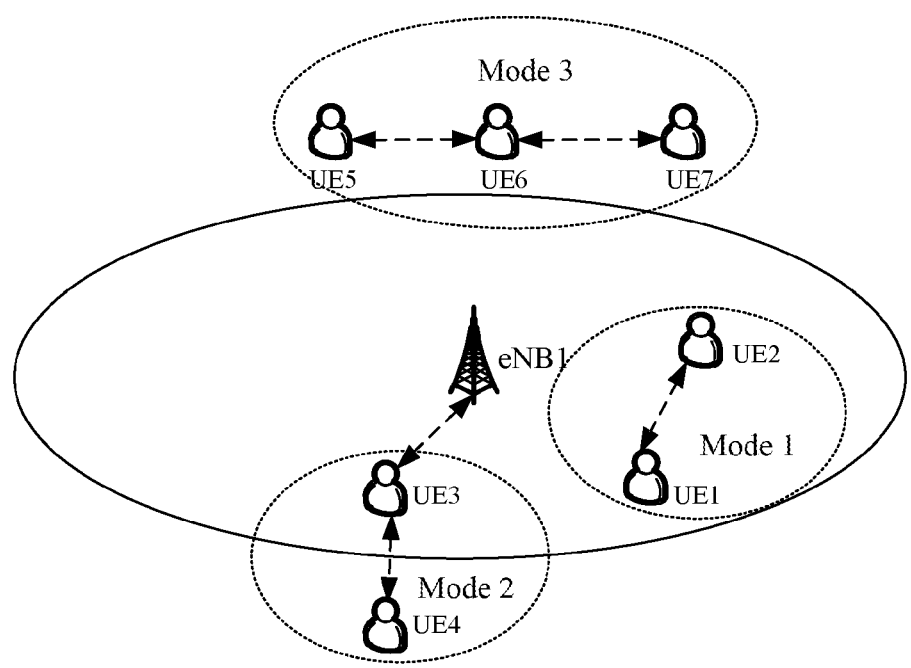
FIG. 1 illustrates a schematic diagram of a D2D application scenario.

In a scenario that coverage of a cellular network exists, D2D communication resources usually are scheduled and allocated by a base station, thereby the reuse efficiency of the resources can be improved, and simultaneously the effects of the control of D2D communication by a network side and the interference coordination between D2D communication and cellular communication can be guaranteed. D2D sending resources can be dynamically scheduled by the base station or the base station can allocate semi-continuous scheduling resources for D2D UE. Under the coverage of the cellular network, the D2D UE can further acquire D2D sending resources through a competition-based mode. In a public security scenario, the D2D communication requires very strong robustness, and services can be still provided to the utmost extent under a situation that current communication resources are in shortage or are congested or network infrastructure is paralyzed. Therefore, the public security requires D2D communication to work not only in a scenario that network coverage exists, but also in a scenario of partial coverage and no network coverage. In the scenario of no network coverage, the D2D user equipment can work through a self-organization mode and acquire the D2D sending resources through a competition mode. In the scenario of no network coverage, a competition resource pool of sending resources of D2D UE can be acquired by a UE from a Prose server or a core network element in advance when the UE is under the coverage of the network, e.g., from a Prose function entity or a Prose APP server.

In the D2D communication, before sending D2D data, a sender D2D UE firstly sends D2D control information, and this D2D control information is usually called as D2D Scheduling Assignment (SA). D2D SA may include resource related information of D2D data associated therewith, such as Resource Block (RB) allocation information and Modulation and Coding Scheme (MCS). The D2D SA may further include a scheduling assignment L1 interface identification (SA L1 ID) (generated by Prose ID), which is used for identifying a PC5 interface between D2D UE, such that receiver D2D UE can filter out D2D data that are wanted to be received, at a physical layer. Before receiving D2D communication data, the receiver D2D UE needs to acquire D2D receiving resource pool information, which includes D2D SA resource pool information for receiving. Then, D2D UE can monitor D2D SA on a D2D SA resource pool for receiving, and acquire resource related information of the D2D communication data in which D2D UE is interested, such as resource occupation situations. In the public security scenario, no matter whether D2D UE for receiving is located under the coverage of the cellular network, the D2D communication data sent by a D2D UE under network coverage or under no network coverage need to be received. If the D2D UE is located under the coverage of the cellular network, the D2D receiving resource pool information can be acquired from a serving base station; and if the D2D UE is located beyond the coverage of the cellular network, the D2D receiving resource pool information is acquired by the D2D UE in advance from the Prose server or the core network element when the D2D UE is under the coverage of the network, such as Prose function or Prose APP server.

In the embodiments of the present document, the D2D UE acquires the D2D receiving resource pool information and monitors the D2D resources according to the D2D receiving resource pool information, thereby the problem that how the D2D UE effectively monitors the D2D resources can be solved, the effect of D2D UE electricity saving is realized and the miss of D2D communication data which possibly need to be received is avoided.

The present document will be further described below in detail with reference to the drawings in combination with the specific embodiments.

Figure 2:
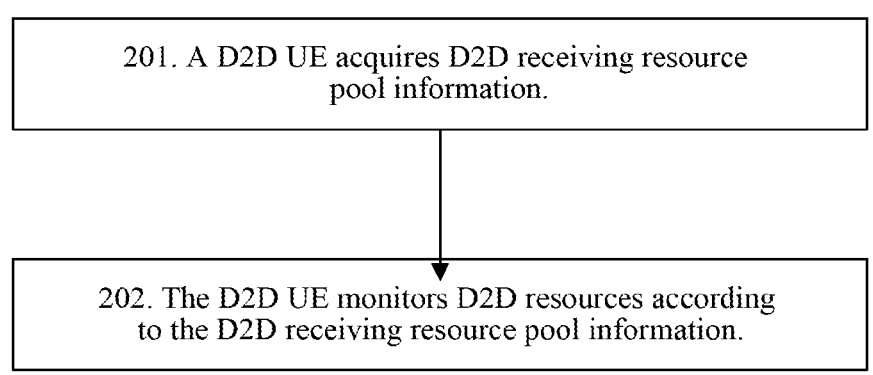
FIG. 2 illustrates a flowchart of a method for monitoring D2D communication data provided by the embodiment of the present document.

The embodiment of the present document implements a method for monitoring Device-to-Device (D2D) communication data. As illustrated in FIG. 2, the method includes the following steps.

In step 201, a D2D UE acquires D2D receiving resource pool information.

In this step, the D2D receiving resource pool information includes D2D SA resource pool information for receiving, and may also include D2D data resource pool information.

The D2D SA resource pool information for receiving includes D2D SA resource pool information for receiving used for a resource allocation mode 1 and/or D2D SA resource pool information for receiving used for a resource allocation mode 2; and the D2D data resource pool information includes D2D data resource pool information for a resource allocation mode 1 and/or D2D data resource pool information for a resource allocation mode 2.

Here, the resource allocation mode 1 is a mode for a base station allocating resources, and the resource allocation mode 2 is a mode for acquiring resources based on competition.

The D2D SA resource pool information for receiving includes a valid timer and/or D2D SA resource pool information for receiving corresponding to at least one D2D group, herein the valid timer is acquired by the D2D UE by means of pre-configuration or default setting or self-setting determined according to a protocol.

The D2D SA resource pool information for receiving corresponding to the at least one D2D group includes at least one D2D group identification.

The D2D SA resource pool information for receiving further includes at least one of: carrier frequency information, bandwidth information, RB information, a subframe pattern, time domain and/or frequency domain resource information, a resource allocation mode, sending or receiving indication information and applicable area information, herein the subframe pattern may be a subframe pattern corresponding to a cell or a subframe pattern corresponding to a D2D group.

The sending or receiving indication information indicates that D2D SA resources are used for D2D sending or D2D receiving.

The applicable area information indicates that the D2D SA resources are used for D2D sending of the D2D UE under cellular network coverage or under no cellular network coverage.

This step specifically may be as follows: the D2D UE acquires the D2D receiving resource pool information from a proximity D2D UE, proximity service function entity or proximity application server or base station; or the D2D UE self-determines the D2D SA resource pool information for receiving according to the D2D group identification of the D2D group to which the D2D UE belongs, herein, when the D2D SA resource pool information is self-determined, the sender D2D UE determines D2D SA resource pool information for sending according to the D2D group identification, and the receiver D2D UE determines the D2D SA resource pool information for receiving according to an identification of a D2D group which is needed for receiving.

After the D2D UE acquires the D2D receiving resource pool information, the D2D UE may further send the D2D receiving resource pool information to the proximity D2D UE through the SA.

Here, when the D2D UE acquires the D2D receiving resource pool information from the proximity D2D UE, the proximity D2D UE acquires D2D SA resource pool information for sending corresponding to the at least one D2D group, includes the D2D SA resource pool information for sending in SA and then sends the D2D SA resource pool information for sending to the D2D UE.

When the D2D UE acquires the D2D receiving resource pool information from the proximity service function entity or the proximity application server or base station, the D2D UE may send information of the at least one D2D group identification to the proximity service function entity or the proximity application server or base station, and receive the D2D receiving resource pool information returned by the proximity service function entity or the proximity application server or base station according to the information of the D2D group identification.

That the D2D UE acquires the D2D receiving resource pool information from the base station may also be as follows:

the D2D UE acquires the D2D receiving resource pool information from the base station through a system message, e.g., the D2D UE sends a D2D receiving resource pool information request to the base station, and after the base station receives the D2D receiving resource pool information request, the base station carries the D2D receiving resource pool information in the system message sent to the D2D UE; or the base station voluntarily carries the D2D receiving resource pool information in the system message sent to the D2D UE;

or the D2D UE acquires the D2D receiving resource pool information from the base station through Radio Resource Control (RRC) dedicated signaling, e.g., the D2D UE sends a D2D receiving resource pool information request to the base station, and after the base station receives the D2D receiving resource pool information request, the base station carries the D2D receiving resource pool information in the RRC dedicated signaling sent to the D2D UE; or the base station voluntarily carries the D2D receiving resource pool information in the RRC dedicated signaling sent to the D2D UE.

After the D2D UE receives the D2D receiving resource pool information, the D2D UE judges whether the D2D receiving resource pool information is valid or not according to the valid timer in the D2D receiving resource pool information, and under a situation that the D2D receiving resource pool information is not valid and the D2D UE further needs to perform D2D communication or D2D data receiving, the D2D UE acquires D2D receiving resource pool information again from the proximity D2D UE or the proximity service function entity or the proximity application server or base station.

That the proximity D2D UE acquires the D2D receiving resource pool information may be as follows:

the proximity D2D UE acquires the D2D SA resource pool information for sending corresponding to the at least one D2D group from the proximity service function entity or the proximity application server or base station;

or the proximity D2D UE acquires the D2D SA resource pool information for sending corresponding to the at least one D2D group from proximity D2D UE of the proximity D2D UE; or the proximity D2D UE voluntarily determines the D2D SA resource pool information for sending corresponding to the at least one D2D group; and the proximity D2D UE sends the D2D SA resource pool information for sending to the D2D UE through the SA.

In step 202, the D2D UE monitors D2D resources according to the D2D receiving resource pool information.

Specifically, when the D2D UE is located in an area covered by a cellular network or an area not covered by the cellular network, the D2D UE monitors D2D SA in a D2D SA resource pool according to the valid timer and/or the D2D SA resource pool information for receiving corresponding to the at least one D2D group in the D2D receiving resource pool information. Specifically, when the D2D receiving resource pool information includes the valid timer, the D2D UE judges whether the D2D receiving resource pool information is valid or not according to the valid timer, and monitors the D2D SA in the D2D SA resource pool associated with the valid timer under a situation that the D2D receiving resource pool information is valid;

when the D2D receiving resource pool information includes the D2D SA resource pool information for receiving corresponding to the at least one D2D group, the D2D UE monitors the D2D SA in the D2D SA resource pool corresponding to the D2D SA resource pool information; and when the D2D receiving resource pool information includes the valid timer and the D2D SA resource pool information for receiving corresponding to the at least one D2D group, the D2D UE judges whether the D2D receiving resource pool information is valid or not according to the valid timer, and monitors the D2D SA in the D2D SA resource pool corresponding to the D2D SA resource pool information under a situation that the D2D receiving resource pool information is valid.

The valid timer is stared after the D2D UE acquires the D2D receiving resource pool information, time indicated by a value which exceeds the valid timer is timeout after the valid timer is started, and that the D2D receiving resource pool information is not valid is judged in case of timeout; and contrarily, time indicated by a value which does not exceed the effective timer is non-timeout, and that the D2D receiving resource pool information is valid is judged in case of non-timeout.

This step further includes that: after the D2D UE is located in the area not covered by the cellular network and when the D2D receiving resource pool information includes the valid timer, the D2D UE judges whether the D2D receiving resource pool information is valid or not according to the valid timer, and under a situation that the D2D receiving resource pool information is not valid, the D2D UE acquires the D2D receiving resource pool information again from the proximity D2D UE or the proximity service function entity or the proximity application server or base station.

That the D2D UE monitors the D2D resources according to the D2D receiving resource pool information may also be as follows:

when the D2D UE acquires D2D SA resource pool information for receiving corresponding to at least one interested D2D group, the D2D UE preferentially monitors the D2D SA in the D2D SA resource pool corresponding to the D2D SA resource pool information, herein the at least one interested D2D group may be at least one D2D group of which the D2D UE is its group member.

In the method embodiment, the base station may be a serving base station or a base station proximity to the D2D UE.

Figure 3:
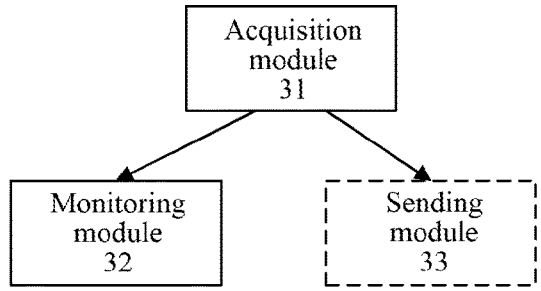
FIG. 3 illustrates a structural schematic diagram of a device for monitoring D2D communication data provided by the embodiment of the present document.

In order to implement the method, the present document further provides a device for monitoring Device-to-Device (D2D) communication data. The device is arranged on a D2D UE. As illustrated in FIG. 3, the device includes an acquisition module 31 and a monitoring module 32, herein, the acquisition module 31 is configured to acquire D2D receiving resource pool information and send the acquired D2D receiving resource pool information to the monitoring module 32, and the monitoring module 32 is configured to monitor D2D resources according to the D2D receiving resource pool information.

Therein, the D2D receiving resource pool information includes D2D Scheduling Assignment (SA) resource pool information for receiving, and may also include D2D data resource pool information.

The D2D SA resource pool information for receiving includes D2D SA resource pool information for receiving for a resource allocation mode 1 and/or D2D SA resource pool information for receiving for a resource allocation mode 2; and the D2D data resource pool information includes D2D data resource pool information for a resource allocation mode 1 and/or D2D data resource pool information for a resource allocation mode 2.

Here, the resource allocation mode 1 is a mode for a base station allocating resources, and the resource allocation mode 2 is a mode for acquiring resources based on competition.

The D2D SA resource pool information for receiving includes a valid timer and/or D2D SA resource pool information for receiving corresponding to at least one D2D group, herein the valid timer is acquired by the D2D UE through a way of pre-configuration or default setting determined according to a protocol or self-setting.

The D2D SA resource pool information for receiving corresponding to the at least one D2D group includes at least one D2D group identification.

The D2D SA resource pool information for receiving further includes at least one of: carrier frequency information, bandwidth information, RB information, a subframe pattern, time domain and/or frequency domain resource information, a resource allocation mode, sending or receiving indication information and applicable area information, herein the subframe pattern may be a subframe pattern corresponding to a cell or a subframe pattern corresponding to a D2D group.

The sending or receiving indication information indicates that D2D SA resources are used for D2D sending or D2D receiving.

The applicable area information indicates that the D2D SA resources are used for D2D sending of D2D UE under cellular network coverage or under no cellular network coverage.

The acquisition module 31 may acquire the D2D receiving resource pool information from a proximity D2D UE, proximity service function entity or proximity application server or base station;

or the acquisition module 31 voluntarily determines the D2D SA resource pool information for receiving according to the D2D group identification of the D2D group to which the D2D UE belongs, herein, when the D2D SA resource pool information is self-determined, sender D2D UE determines D2D SA resource pool information for sending according to the D2D group identification, and receiver D2D UE determines the D2D SA resource pool information for receiving according to an identification of a D2D group which is needed to be received.

The device further includes a sending module 33 configured to send the D2D receiving resource pool information to proximity D2D UE through the SA.

That the acquisition module 31 acquires the D2D receiving resource pool information from the base station may be specifically as follows:

The acquisition module 31 acquires the D2D receiving resource pool information from the base station through a system message, or the acquisition module 31 acquires the D2D receiving resource pool information from the base station through a RRC dedicated signaling.

The monitoring module 32 is specifically configured to, when D2D UE in which the monitoring module 32 is located is located in an area covered by a cellular network or an area not covered by the cellular network, monitor D2D SA in a D2D SA resource pool according to the valid timer and/or the D2D SA resource pool information for receiving corresponding to the at least one D2D group in the D2D receiving resource pool information. Specifically, when the D2D receiving resource pool information includes the valid timer, the monitoring module judges whether the D2D receiving resource pool information is valid or not according to the valid timer, and monitors the D2D SA in the D2D SA resource pool associated with the valid timer under a situation that the D2D receiving resource pool information is valid;

when the D2D receiving resource pool information includes the D2D SA resource pool information for receiving corresponding to the at least one D2D group, the monitoring module monitors the D2D SA in the D2D SA resource pool corresponding to the D2D SA resource pool information; and when the D2D receiving resource pool information includes the valid timer and the D2D SA resource pool information for receiving corresponding to the at least one D2D group, the monitoring module judges whether the D2D receiving resource pool information is valid or not according to the valid timer, and monitors the D2D SA in the D2D SA resource pool corresponding to the D2D SA resource pool information under a situation that the D2D receiving resource pool information is valid.

The valid timer is started after the D2D UE acquires the D2D receiving resource pool information, time indicated by a value which exceeds the valid timer is timeout after the valid timer is started, and that the D2D receiving resource pool information is not valid is judged in case of timeout;

and contrarily, time indicated by a value which does not exceed the effective timer is non-timeout, and that the D2D receiving resource pool information is valid is judged in case of non-timeout.

The monitoring module 32 is further configured to, after the D2D UE in which the monitoring module 32 is located is located in the area not covered by the cellular network and when the D2D receiving resource pool information includes the effective timer, judge whether the D2D receiving resource pool information is effective or not according to the effective timer, and under a situation that the D2D receiving resource pool information is not effective, inform the acquisition module 31 to acquire D2D receiving resource pool information again from the proximity D2D UE or the proximity service function entity or the proximity application server or base station.

The acquisition module 31 is specifically configured to, when the acquisition module acquires D2D SA resource pool information for receiving corresponding to at least one interested D2D group, inform the monitoring module 32, herein the at least one interested D2D group may be at least one D2D group of which the D2D UE is a group member.

The acquisition module 32 is specifically configured to preferentially monitor the D2D SA in the D2D SA resource pool corresponding to the D2D SA resource pool information.

In the device embodiment, the base station may be a serving base station or a base station that is proximity to the D2D UE.

In order to better understand the present document, the present document will be further described below in combination with the specific embodiments.

Embodiment 1

Figure 4:
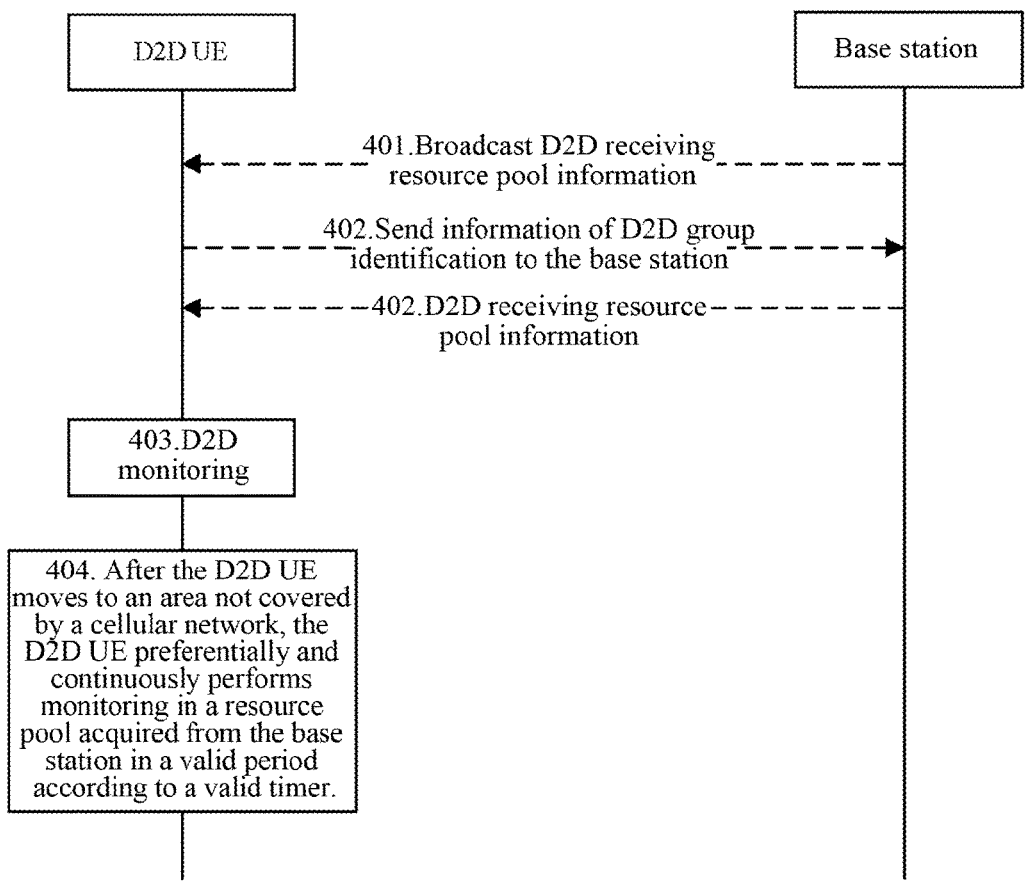
FIG. 4 illustrates a flowchart of a method for monitoring D2D communication data provided by embodiment 1 of the present document.

This embodiment describes a method for monitoring D2D communication data implemented after a D2D UE acquires D2D receiving resource pool information from a base station. As illustrated in FIG. 4, the method includes the following steps.

In step 401, the D2D UE receives D2D receiving resource pool information from a base station by receiving a system broadcast message.

Therein, the D2D receiving resource pool information includes D2D SA resource pool information for receiving, and may also include D2D data resource pool information.

The D2D SA resource pool information for receiving includes D2D SA resource pool information for receiving used for a resource allocation mode 1 and/or D2D SA resource pool information for receiving used for a resource allocation mode 2; the D2D data resource pool information includes D2D data resource pool information used for a resource allocation mode 1 and/or D2D data resource pool information used for a resource allocation mode 2.

Here, the resource allocation mode 1 is a mode for the base station allocating resources, and the resource allocation mode 2 is a mode for acquiring resources based on competition.

The D2D SA resource pool information for receiving includes a valid timer and/or D2D SA resource pool information for receiving corresponding to at least one D2D group, herein the valid timer is acquired by the D2D UE through a way of pre-configuration or default setting determined according to a protocol or self-setting determined.

The D2D SA resource pool information for receiving corresponding to the at least one D2D group includes at least one D2D group identification.

The D2D SA resource pool information for receiving further includes at least one of: carrier frequency information, bandwidth information, RB information, a subframe pattern, time domain and/or frequency domain resource information, a resource allocation mode, sending or receiving indication information and applicable area information, herein the subframe pattern may be a subframe pattern corresponding to a cell or a subframe pattern corresponding to a D2D group.

The sending or receiving indication information indicates that D2D SA resources are used for D2D sending or D2D receiving.

The applicable area information indicates that the D2D SA resources are used for D2D sending of D2D UE under cellular network coverage or under no cellular network coverage.

Alternatively, the base station maintains resource pool information used in the D2D groups for different D2D groups.

This step specifically may be as follows: the D2D UE receives D2D receiving resource pool information from the base station by receiving the system broadcast message.

After the D2D UE acquires the D2D receiving resource pool information, the D2D UE may further include the D2D receiving resource pool information in SA and send the SA to a proximity D2D UE.

In step 402, the D2D UE sends information of a D2D group identification of an interested D2D group to the base station, or the D2D UE sends a D2D group identification of a D2D group for performing D2D sending or D2D receiving to the base station, or the D2D UE sends a D2D receiving resource pool information request to the base station to request the base station to send D2D receiving resource pool information; and the D2D UE receives the D2D receiving resource pool information returned by the base station.

In this step, that the D2D UE receives the D2D receiving resource pool information returned by the base station may be specifically as follows: the D2D UE receives the D2D receiving resource pool information returned by the base station according to the information of the D2D group identification.

Therein, the D2D receiving resource pool information includes D2D SA resource pool information for receiving, and may also include D2D data resource pool information.

The D2D SA resource pool information for receiving includes D2D SA resource pool information for receiving used for a resource allocation mode 1 and/or D2D SA resource pool information for receiving used for a resource allocation mode 2; and the D2D data resource pool information includes D2D data resource pool information used for a resource allocation mode 1 and/or D2D data resource pool information used for a resource allocation mode 2.

Here, the resource allocation mode 1 is a mode for a base station allocating resources, and the resource allocation mode 2 is a mode for acquiring resources based on competition.

The D2D SA resource pool information for receiving includes a valid timer and/or D2D SA resource pool information for receiving corresponding to at least one D2D group, herein the valid timer is acquired by the D2D UE through a way of pre-configuration or default setting determined according to a protocol or self-setting.

The D2D SA resource pool information for receiving corresponding to the at least one D2D group includes at least one D2D group identification.

The D2D SA resource pool information for receiving further includes at least one of: carrier frequency information, bandwidth information, RB information, a subframe pattern, time domain and/or frequency domain resource information, a resource allocation mode, sending or receiving indication information and applicable area information, herein the subframe pattern may be a subframe pattern corresponding to a cell or a subframe pattern corresponding to a D2D group.

The sending or receiving indication information indicates that D2D SA resources are used for D2D sending or D2D receiving.

The applicable area information indicates that the D2D SA resources are used for D2D sending of D2D UE under cellular network coverage or under no cellular network coverage.

The above step 401 and step 402, it is to execute the step 401 firstly and then execute the step 402, or only execute one of step 401 and step 402

In step 403, the D2D UE monitors D2D resources according to the D2D receiving resource pool information received from the base station.

Specifically, when the D2D UE is located in an area covered by a cellular network or an area not covered by the cellular network, the D2D UE monitors D2D SA in a D2D SA resource pool according to the valid timer, and/or the D2D SA resource pool information and a D2D group identification list corresponding to the D2D SA resource pool information, and/or the D2D SA resource pool information for receiving corresponding to the at least one D2D group in the D2D receiving resource pool information. Specifically, when the D2D receiving resource pool information includes the valid timer, the D2D UE judges whether the D2D receiving resource pool information is valid according to the valid timer, and monitors the D2D SA in the D2D SA resource pool associated with the valid timer under a situation that the D2D receiving resource pool information is valid;

when the D2D receiving resource pool information includes the D2D SA resource pool information for receiving corresponding to the at least one D2D group, the D2D UE monitors the D2D SA in the D2D SA resource pool corresponding to the D2D SA resource pool information; and when the D2D receiving resource pool information includes the valid timer and the D2D SA resource pool information for receiving corresponding to the at least one D2D group, the D2D UE judges whether the D2D receiving resource pool information is valid according to the valid timer, and monitors the D2D SA in the D2D SA resource pool corresponding to the D2D SA resource pool information under a situation that the D2D receiving resource pool information is valid.

When the D2D UE acquires D2D SA resource pool information for receiving corresponding to at least one interested D2D group, the D2D UE preferentially monitors the D2D SA in the D2D SA resource pool corresponding to the D2D SA resource pool information, herein the at least one interested D2D group may be at least one D2D group of which the D2D UE is a group member.

In step 404, after the D2D UE moves to the area not covered by the cellular network and when the D2D receiving resource pool information includes the valid timer, the D2D UE judges whether the D2D receiving resource pool information is valid according to the valid timer, if the D2D receiving resource pool information is valid, the D2D UE continuously monitors the D2D SA in the D2D SA resource pool corresponding to the D2D SA resource pool information for receiving, and if the D2D receiving resource pool information is not valid, the D2D UE acquires D2D receiving resource pool information again from the proximity D2D UE or proximity service function entity or proximity application server; and the proximity service function entity may be Prose function, and the proximity service application serve may be a Prose APP Server.

The D2D UE may save the D2D receiving resource pool information which was ever monitored, and monitor the D2D SA in the D2D receiving resource pool which was ever monitored.

Similarly, when the D2D UE uses the method of allocating resources based on competition, the D2D UE may voluntarily determine an available competition resource set in a D2D sending resource pool which is allowed for use, e.g., after a D2D resource occupation situation is obtained through a D2D monitoring mode, relatively idle resources are selected as competition resources which are allowed for use, and then the D2D UE may include the competition resource set in SA and send the SA to the proximity D2D UE.

Embodiment 2

Figure 5:
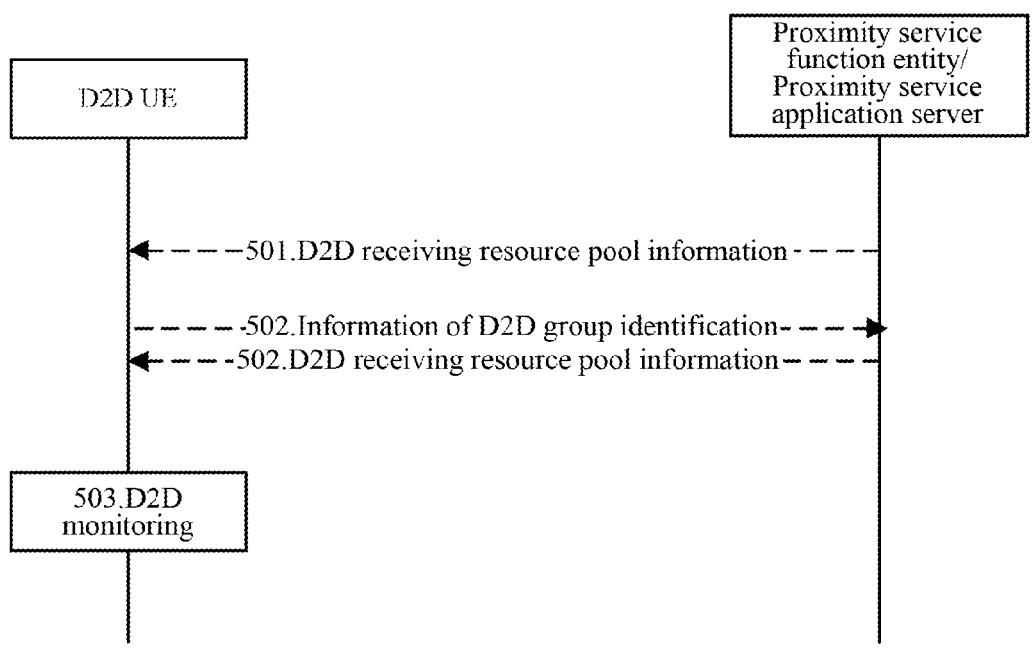
FIG. 5 illustrates a flowchart of a method for monitoring D2D communication data provided by embodiment 2 of the present document.

This embodiment describes a method for monitoring D2D communication data implemented after D2D UE under no cellular network coverage acquires D2D receiving resource pool information from a proximity service function entity/proximity service application server (Prose function/Prose APP server). As illustrated in FIG. 5, the method includes the following steps.

In step 501, a D2D UE receives D2D receiving resource pool information from a Prose function/Prose APP server.

Therein, the D2D receiving resource pool information includes D2D SA resource pool information for receiving, and may also include D2D data resource pool information.

The D2D SA resource pool information for receiving includes D2D SA resource pool information for receiving used for a resource allocation mode 1 and/or D2D SA resource pool information for receiving used for a resource allocation mode 2; the D2D data resource pool information includes D2D data resource pool information for a resource allocation mode 1 and/or D2D data resource pool information for a resource allocation mode 2.

Here, the resource allocation mode 1 is a mode for a base station allocating resources, and the resource allocation mode 2 is a mode for acquiring resources based on competition.

The D2D SA resource pool information for receiving includes a valid timer and/or D2D SA resource pool information for receiving corresponding to at least one D2D group, herein the valid timer is acquired by the D2D UE through a way of pre-configuration or default setting determined according to a protocol or self-setting.

The D2D SA resource pool information for receiving corresponding to the at least one D2D group includes at least one D2D group identification.

The D2D SA resource pool information for receiving further includes at least one of: carrier frequency information, bandwidth information, RB information, a subframe pattern, time domain and/or frequency domain resource information, a resource allocation mode, sending or receiving indication information and applicable area information, herein the subframe pattern may be a subframe pattern corresponding to a cell or a subframe pattern corresponding to a D2D group.

The sending or receiving indication information indicates that D2D SA resources are used for D2D sending or D2D receiving.

The applicable area information indicates that the D2D SA resources are used for D2D sending of D2D UE under cellular network coverage or under no cellular network coverage.

Alternatively, the Prose function/Prose APP server maintains resource pool information used in the D2D groups for different D2D groups.

This step specifically may be as follows: the D2D UE receives D2D receiving resource pool information from the Prose function/Prose APP server.

After the D2D UE acquires the D2D receiving resource pool information, the D2D UE may further include the D2D receiving resource pool information in SA and send the SA to the proximity D2D UE.

In step 502, the D2D UE sends information of a D2D group identification of an interested D2D group to the Prose function/Prose APP server, or the D2D UE sends a D2D group identification of a D2D group for performing D2D sending or D2D receiving to the Prose function/Prose APP server, or the D2D UE sends a D2D receiving resource pool information request to the Prose function/Prose APP server to request the Prose function/Prose APP server to send D2D receiving resource pool information; and the D2D UE receives the D2D receiving resource pool information returned by the Prose function/Prose APP server.

In this step, the D2D UE receiving the D2D receiving resource pool information returned by the Prose function/Prose APP server may be specifically as follows: the D2D UE receives the D2D receiving resource pool information returned by the Prose function/Prose APP server according to the information of the D2D group identification.

Therein, the D2D receiving resource pool information includes D2D SA resource pool information for receiving, and may also include D2D data resource pool information.

The D2D SA resource pool information for receiving includes D2D SA resource pool information for receiving used for a resource allocation mode 1 and/or D2D SA resource pool information for receiving used for a resource allocation mode 2; and the D2D data resource pool information includes D2D data resource pool information for a resource allocation mode 1 and/or D2D data resource pool information for a resource allocation mode 2.

Here, the resource allocation mode 1 is a mode for a base station allocating resources, and the resource allocation mode 2 is a mode for acquiring resources based on competition.

The D2D SA resource pool information for receiving includes a valid timer and/or D2D SA resource pool information for receiving corresponding to at least one D2D group, herein the valid timer is acquired by the D2D UE through pre-configuration or default setting determined according to a protocol or self-setting.

The D2D SA resource pool information for receiving corresponding to the at least one D2D group includes at least one D2D group identification.

The D2D SA resource pool information for receiving further includes at least one of: carrier frequency information, bandwidth information, RB information, a subframe pattern, time domain and/or frequency domain resource information, a resource allocation mode, sending or receiving indication information and applicable area information, herein the subframe pattern may be a subframe pattern corresponding to a cell or a subframe pattern corresponding to a D2D group.

The sending or receiving indication information indicates that D2D SA resources are used for D2D sending or D2D receiving.

The applicable area information indicates that the D2D SA resources are used for D2D sending of the D2D UE under cellular network coverage or under no cellular network coverage.

For above step 501 and step 502, it is to firstly execute the step 501 executed and then execute the step 502, or only execute one of step 501 and step 502.

In step 503, the D2D UE monitors D2D resources according to the D2D receiving resource pool information received from the Prose function/Prose APP server.

Specifically, when the D2D UE is located in an area covered by a cellular network or an area not covered by the cellular network, the D2D UE monitors D2D SA in a D2D SA resource pool according to the effective timer, and/or the D2D SA resource pool information and a D2D group identification list corresponding to the D2D SA resource pool information, and/or the D2D SA resource pool information for receiving corresponding to the at least one D2D group in the D2D receiving resource pool information. Specifically, when the D2D receiving resource pool information includes the valid timer, the D2D UE judges whether the D2D receiving resource pool information is valid according to the valid timer, and monitors the D2D SA in the D2D SA resource pool associated with the valid timer under a situation that the D2D receiving resource pool information is valid;

when the D2D receiving resource pool information includes the D2D SA resource pool information for receiving corresponding to the at least one D2D group, the D2D UE monitors the D2D SA in the D2D SA resource pool corresponding to the D2D SA resource pool information; and when the D2D receiving resource pool information includes the valid timer and the D2D SA resource pool information for receiving corresponding to the at least one D2D group, the D2D UE judges whether the D2D receiving resource pool information is valid according to the valid timer, and monitors the D2D SA in the D2D SA resource pool corresponding to the D2D SA resource pool information under a situation that the D2D receiving resource pool information is valid.

When the D2D UE acquires D2D SA resource pool information for receiving corresponding to at least one interested D2D group, the D2D UE preferentially monitors the D2D SA in the D2D SA resource pool corresponding to the D2D SA resource pool information, herein the at least one interested D2D group may be at least one D2D group of which the D2D UE is a group member.

If the method for monitoring D2D communication data provided by the embodiment illustrated in FIG. 2 of the present document is implemented by means of software function modules and is sold or used as an independent product, the method may also be stored in a computer readable storage medium. Based on such understanding, one skilled in the art shall understand that the embodiments of the present application may be provided in the form of methods, systems or computer program products. Therefore, the present application may adopt the form of full hardware embodiments, full software embodiments or combined software and hardware embodiments. In addition, the present application may adopt the form of computer program products implemented based on one or more of computer usable memory media including computer usable program codes therein. The storage medium includes but not limited to a USB flash disk a mobile storage device, a Read-Only Memory (ROM), a magnetic disk memory, a CD-ROM, an optical memory, etc.

The present application is described by referring to flowcharts and/or block diagrams of the method, the apparatus (system) and the computer program product according to the embodiments of the present application. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for implementing functions designated in one process or more processes of the flowcharts and/or one block or more blocks of the block diagrams.

These computer program instructions may also be stored in computer-readable memories which can guide computers or other programmable data processing devices to work in a specific manner, such that the instructions stored in the computer-readable memories produce products including instruction devices, and the instruction devices realize functions designated in one process or more processes of the flowcharts and/or one block or more blocks of the block diagrams.

Correspondingly, the embodiment of the present document further provides a computer storage medium storing computer programs, herein the computer programs are used for executing the method for monitoring D2D communication data provided by the embodiment illustrated in FIG. 2 of the present document.

The above-mentioned embodiments are just embodiments of the present document and are not used for limiting the protection range of the present document. Any modification, equipment replacement, improvement and the like made within the spirit and principle of the present document shall be also included in the protection scope of the present document.

What we claim is:

1. A method for monitoring Device-to-Device, D2D, communication, comprising:
    a D2D User Equipment UE, acquiring D2D receiving resource pool information and monitoring D2D resources according to the D2D receiving resource pool information; wherein
    the D2D receiving resource pool information comprises D2D Scheduling Assignment, SA, resource pool information for receiving; wherein
    the D2D SA resource pool information for receiving comprises a valid timer or D2D SA resource pool information for receiving corresponding to at least one D2D group; wherein,
    the valid timer is acquired by the D2D UE through a way of pre-configuration or default setting determined according to a protocol or self-setting; or
    the D2D SA resource pool information for receiving corresponding to the at least one D2D group comprises at least one D2D group identification; wherein
    the D2D SA resource pool information for receiving corresponding to the at least one D2D group further comprises at least one of: carrier frequency information, bandwidth information, Resource Block, RB, information, a subframe pattern, time domain or frequency domain resource information, a resource allocation mode, sending or receiving indication information and applicable area information; wherein
    the D2D UE acquiring the D2D receiving resource pool information comprises: the D2D UE voluntarily determining the D2D SA resource pool information for receiving according to the D2D group identification of the D2D group to which the D2D UE belongs.

2. The method for monitoring D2D communication according to claim 1, wherein the D2D receiving resource pool information further comprises D2D data resource pool information;
    or
    wherein the D2D SA resource pool information for receiving comprises D2D SA resource pool information for receiving used for a resource allocation mode 1 or D2D SA resource pool information for receiving used for a resource allocation mode 2.

3. The method for monitoring D2D communication according to claim 1, wherein the D2D UE acquiring the D2D receiving resource pool information comprises: the D2D UE acquiring the D2D receiving resource pool information from a proximity D2D UE, a proximity service function entity or a proximity application server or a base station.

4. The method for monitoring D2D communication according to claim 3, wherein the D2D UE acquiring the D2D receiving resource pool information from a proximity D2D UE, a proximity service function entity or a proximity application server or a base station comprises: the D2D UE sending information of the at least one D2D group identification to the proximity service function entity or the proximity application server or the base station, and receiving D2D receiving resource pool information returned by the proximity service function entity or the proximity application server or the base station according to the information of the D2D group identification;
    or
    wherein the D2D UE acquiring the D2D receiving resource pool information from the base station comprises: the D2D UE acquiring the D2D receiving resource pool information from the base station through a system message; or the D2D UE acquiring the D2D receiving resource pool information from the base station through a Radio Resource Control, RRC, dedicated signaling;
    or
    wherein, when the D2D UE acquiring the D2D receiving resource pool information from the proximity D2D UE, the method further comprises:
    the proximity D2D UE acquiring D2D SA resource pool information for sending corresponding to the at least one D2D group from the proximity service function entity or the proximity application server or the base station; or the proximity D2D UE acquiring D2D SA resource pool information for sending corresponding to the at least one D2D group from a proximity D2D UE of itself; or
    the proximity D2D UE voluntarily determining D2D SA resource pool information for sending corresponding to the at least one D2D group; and the proximity D2D UE sending the D2D SA resource pool information for sending to the D2D UE through SA;
    or
    wherein monitoring D2D resources according to the D2D receiving resource pool information comprises: when the D2D UE acquires D2D SA resource pool information for receiving corresponding to at least one interested D2D group, the D2D UE preferentially monitoring D2D SA in a D2D SA resource pool corresponding to the D2D SA resource pool information, wherein the at least one interested D2D group is at least one D2D group of which the D2D UE is a group member.

5. The method for monitoring D2D communication according to claim 1, wherein monitoring D2D resources according to the D2D receiving resource pool information comprises: when the D2D UE is located in an area covered by a cellular network or an area not covered by the cellular network, monitoring D2D SA in a D2D SA resource pool according to the valid timer or the D2D SA resource pool information for receiving corresponding to the at least one D2D group included in the D2D receiving resource pool information, wherein monitoring the D2D SA in the D2D SA resource pool according to the valid timer or the D2D SA resource pool information for receiving corresponding to the at least one D2D group included in the D2D receiving resource pool information comprises:

when the D2D receiving resource pool information includes the valid timer, judging whether the D2D receiving resource pool information is valid according to the valid timer, and monitoring D2D SA in a D2D SA resource pool associated with the valid timer under a situation that the D2D receiving resource pool information is valid;

when the D2D receiving resource pool information includes the D2D SA resource pool information for receiving corresponding to the at least one D2D group, monitoring D2D SA in a D2D SA resource pool corresponding to the D2D SA resource pool information; and when the D2D receiving resource pool information includes the valid timer and the D2D SA resource pool information for receiving corresponding to the at least one D2D group, judging whether the D2D receiving resource pool information is valid according to the valid timer, and monitoring D2D SA in a D2D SA resource pool corresponding to the D2D SA resource pool information under a situation that the D2D receiving resource pool information is valid.

6. A device for monitoring Device-to-Device, D2D, communication data, wherein, the device comprising:

hardware performing instructions in an acquisition module and a monitoring module stored in a non-transitory computer readable medium which executes steps, acquiring 2D receiving resource pool information and send the acquired D2D receiving resource pool information to the monitoring module; and monitoring D2D resources according to the D2D receiving resource pool information; wherein the D2D receiving resource pool information comprises D2D Scheduling Assignment, SA, resource pool information for receiving; wherein the D2D SA resource pool information for receiving comprises a valid timer or D2D SA resource pool information for receiving corresponding to at least one D2D group; wherein the valid timer is acquired by the D2D UE through a way of pre-configuration or default setting determined according to a protocol or self-setting; or the D2D SA resource pool information for receiving corresponding to the at least one D2D group comprises at least one D2D group identification; wherein the D2D SA resource pool information for receiving corresponding to at least one D2D group further comprises at least one of: carrier frequency information, bandwidth information, Resource Block, RB, information, a subframe pattern, time domain or frequency domain resource information, a resource allocation mode, sending or receiving indication information and applicable area information; wherein determining voluntarily the D2D SA resource pool information for receiving according to the D2D group identification of the D2D group to which the D2D UE belongs;

or wherein acquiring the D2D receiving resource pool information from the base station through a system message, or acquire the D2D receiving resource pool information from the base station through a Radio Resource Control, RRC, dedicated signaling.

7. The device for monitoring D2D communication data according to claim 6, wherein the D2D receiving resource pool information further comprises D2D data resource pool information;

or wherein the D2D SA resource pool information for receiving comprises D2D SA resource pool information for receiving used for a resource allocation mode 1 or D2D SA resource pool information for receiving used for a resource allocation mode 2.

8. The device for monitoring D2D communication data according to claim 6, wherein the acquisition module is configured to acquire the D2D receiving resource pool information from a proximity D2D UE, a proximity service function entity or a proximity application server or a base station.

9. The device for monitoring D2D communication data according to claim 8, wherein the monitoring module is configured to, when the D2D UE is located in an area covered by a cellular network or an area not covered by the cellular network, monitor D2D SA in a D2D SA resource pool according to the valid timer or D2D SA resource pool information corresponding to the at least one D2D group included in the D2D receiving resource pool information, wherein the monitoring module is configured to, when the D2D receiving resource pool information includes the valid timer, judge whether the D2D receiving resource pool information is valid according to the valid timer, and monitor D2D SA in a D2D SA resource pool associated with the valid timer under a situation that the D2D receiving resource pool information is valid;

when the D2D receiving resource pool information includes the D2D SA resource pool information corresponding to the at least one D2D group, monitor D2D SA in a D2D SA resource pool corresponding to the D2D SA resource pool information; and when the D2D receiving resource pool information comprises the valid timer and the D2D SA resource pool information corresponding to the at least one D2D group, judge whether the D2D receiving resource pool information is valid according to the valid timer, and monitor D2D SA in a D2D SA resource pool corresponding to the D2D SA resource pool information under a situation that the D2D receiving resource pool information is valid.

10. The device for monitoring D2D communication data according to claim 8, wherein the acquisition module is configured to, when D2D SA resource pool information corresponding to at least one interested D2D group is acquired, inform the monitoring module, wherein the at least one interested D2D group is at least one D2D group of which the D2D UE is a group member; and the monitoring module is configured to preferentially monitor D2D SA in a D2D SA resource pool corresponding to the D2D SA resource pool information.

11. A non-transitory computer storage medium, storing computer program, wherein the computer program is used for executing the method for monitoring D2D communication data according to claim 1.

* * * * *